United States Patent
Beckham et al.

(10) Patent No.: US 11,023,007 B2
(45) Date of Patent: Jun. 1, 2021

(54) CONNECTION AND MOISTURE DETECTION

(71) Applicant: Apple Inc., Cupertino, CA (US)

(72) Inventors: Brandon J. Beckham, Santa Clarita, CA (US); Gabriel Sanchez Barba, Hawthorne, CA (US); Isikcan Yilmaz, Los Angeles, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/541,090

(22) Filed: Aug. 14, 2019

(65) Prior Publication Data

US 2020/0319675 A1   Oct. 8, 2020

Related U.S. Application Data

(60) Provisional application No. 62/828,423, filed on Apr. 2, 2019.

(51) Int. Cl.
| | | |
|---|---|---|
| *G06F 1/16* | (2006.01) | |
| *H02M 3/158* | (2006.01) | |
| *G01N 27/22* | (2006.01) | |
| *G01N 27/04* | (2006.01) | |

(52) U.S. Cl.
CPC ......... *G06F 1/1632* (2013.01); *G01N 27/048* (2013.01); *G01N 27/223* (2013.01); *H02M 3/158* (2013.01)

(58) Field of Classification Search
CPC .................................................... G06F 1/1632
See application file for complete search history.

(56) References Cited

U.S. PATENT DOCUMENTS

| | | |
|---|---|---|
| 4,092,596 A | 5/1978 | Dickinson |
| 4,232,262 A | 11/1980 | Emo |
| 5,097,213 A | 3/1992 | Hunting |
| 5,166,807 A | 11/1992 | Masuda |
| 5,263,195 A | 11/1993 | Panther et al. |
| 5,321,350 A | 6/1994 | Haas |
| 5,440,263 A | 8/1995 | Fournel |
| 5,724,005 A | 3/1998 | Chen |
| 6,141,169 A | 10/2000 | Pietruszynski |
| 6,151,649 A | 11/2000 | Liong |
| 6,275,144 B1 | 8/2001 | Rumbaugh |
| 7,170,259 B2 | 1/2007 | Veselic |
| 7,271,568 B2 | 9/2007 | Purdy |
| 7,627,128 B2 | 12/2009 | Sander |
| 8,261,000 B2 | 9/2012 | Kelley |
| 8,332,664 B2 | 12/2012 | Farrar |
| 8,397,982 B2 | 3/2013 | Slaby |
| 8,898,348 B2 | 11/2014 | Minoo |
| 9,030,208 B2 | 5/2015 | Shoykhet |

(Continued)

OTHER PUBLICATIONS

Notice of Allowance dated Mar. 24, 2020 in U.S. Appl. No. 14/818,239, 13 pages.

(Continued)

*Primary Examiner* — Henry Tsai
*Assistant Examiner* — Juanito Borromeo
(74) *Attorney, Agent, or Firm* — Kilpatrick Townsend & Stockton, LLP (57) ABSTRACT

Methods, structures, and apparatus that are able to detect the presence of a connection to a contact of an electronic device and are also able to detect the presence of moisture at the contact.

19 Claims, 6 Drawing Sheets

(56) References Cited

U.S. PATENT DOCUMENTS

| | | | |
|---|---|---|---|
| 9,488,564 B2* | 11/2016 | Zielinski | G01N 19/10 |
| 10,184,909 B2 | 1/2019 | Gupta et al. | |
| 10,742,050 B2 | 8/2020 | Rich et al. | |
| 2005/0174094 A1 | 8/2005 | Purdy | |
| 2005/0249271 A1 | 11/2005 | Lau | |
| 2007/0106828 A1 | 5/2007 | Kelley | |
| 2007/0234420 A1 | 10/2007 | Novotney | |
| 2007/0291825 A1 | 12/2007 | Endoh | |
| 2008/0026712 A1 | 1/2008 | Leutgeb et al. | |
| 2009/0091422 A1 | 4/2009 | Minoo | |
| 2010/0046670 A1 | 2/2010 | Tsui et al. | |
| 2010/0083012 A1 | 4/2010 | Corbridge et al. | |
| 2010/0303099 A1 | 12/2010 | Rieken | |
| 2011/0038282 A1 | 2/2011 | Mihota | |
| 2011/0087818 A1 | 4/2011 | Kelley et al. | |
| 2012/0026018 A1 | 2/2012 | Lin et al. | |
| 2012/0153016 A1 | 6/2012 | Slaby et al. | |
| 2012/0250637 A1 | 10/2012 | Haas et al. | |
| 2013/0207938 A1 | 8/2013 | Ryshtun | |
| 2013/0305066 A1 | 11/2013 | Mullins | |
| 2014/0191588 A1* | 7/2014 | Stevens | G06F 1/1632 307/125 |
| 2015/0036768 A1 | 2/2015 | Kwon et al. | |
| 2015/0208154 A1* | 7/2015 | Turner | H04R 29/00 381/58 |
| 2016/0094368 A1 | 3/2016 | Lew | |
| 2017/0358922 A1 | 12/2017 | Bacon | |
| 2018/0026461 A1 | 1/2018 | Rich et al. | |

OTHER PUBLICATIONS

Office Action dated Jan. 9, 2020 in U.S. Appl. No. 15/721,182, 19 pages.
PCT/US2015/043670, "International Search Report and Written Opinion," dated Mar. 24, 2016, 19 pages.
Office Action dated Oct. 10, 2017 in U.S. Appl. No. 14/818,239, 41 pages.
Office Action dated May 17, 2018 in U.S. Appl. No. 14/818,239, 44 pages.
First Office Action (English Translation) dated Aug. 28, 2018 in Chinese Patent Application No. 201580041959.2, 19 pages.
Office Action (English Translation) dated Jun. 24, 2019 in Chinese Patent Application No. 201580041959.2, 5 pages.
Office Action dated Jul. 29, 2019 in U.S. Appl. No. 14/818,239, 16 pages.
U.S. Appl. No. 15/721,182, Non-Final Office Action dated Aug. 11, 2020, 18 pages.

* cited by examiner

CONNECTION AND MOISTURE DETECTION

CROSS-REFERENCES TO RELATED APPLICATIONS

This application claims the benefit of U.S. provisional patent application No. 62/828,423, filed Apr. 2, 2019, which is incorporated by reference.

BACKGROUND

The amount of data transferred between electronic devices has grown tremendously the last several years. Large amounts of audio, streaming video, text, and other types of data content are now regularly transferred among desktop and portable computers, media devices, handheld media devices, displays, storage devices, and other types of electronic devices.

Power and data can be provided from one electronic device to another over cables that can include one or more wire conductors, fiber optic cables, or other conductors. Connector inserts can be located at each end of these cables and can be inserted into connector receptacles in the communicating or power transferring electronic devices. Contacts in or on a connector insert can form electrical connections with corresponding contacts in a connector receptacle. Other devices can have contacts at a surface of a device. Pathways for power and data can be formed when devices are attached together or positioned next to each other and corresponding contacts are electrically connected to each other.

Once these pathways are formed, the connected devices can share power, data, or both. Accordingly, it can be desirable for a device to be able to detect when such a connection has been made.

These various contacts in connector inserts, in connector receptacles, or on a surface of a device, can be exposed to the local environment where they can encounter liquid, moisture, or other damaging contaminants. For example, liquids can be spilled on these contacts or a device can be set down such that its contacts land in a puddle of liquid. Users can swim or exercise while wearing or holding an electric device. These activities can put contacts for the electronic devices in a position to encounter various contaminants such as chlorinated water, sweat, or other moisture.

These liquids, moisture, or other contaminants can corrode and damage the contacts. This corrosion can be greatly exacerbated by the presence of an electric potential, such as when a voltage is applied to a contact. Accordingly, it can be desirable for a device to be able to detect the presence of moisture or other contaminant at a contact so that the possible damage can be mitigated.

Thus, what is needed are methods, structures, and apparatus that are able to detect the presence of a connection to a contact of an electronic device and are also able to detect the presence of moisture or contamination at the contact.

SUMMARY

Accordingly, embodiments of the present invention can provide methods, structures, and apparatus that can detect the presence of a connection to a contact of an electronic device and can also detect the presence of moisture or contamination at the contact.

An illustrative embodiment of the present invention can provide circuitry that can detect a connection of an accessory to an electronic device, such as a docking station. This circuitry can also detect the presence or absence of moisture at the connection between the accessory and the docking station. The use of the same circuitry to detect a connection and to detect moisture can reduce power consumption and conserve resources.

These and other embodiments of the present invention can provide a docking station having one or more recesses or receptacles for one or more accessories. The accessories can include one or more contacts to mate with one or more corresponding contacts on the docking station, for example in a corresponding recesses in the docking station. These contacts can be used to convey power, ground, data, or other signals, voltages, or bias lines.

These and other embodiments of the present invention can provide a current source that can provide a current into a contact of the docking station. An accessory can have a known capacitor connected to an accessory contact that mates with the docking station contact. When the accessory and the known capacitor are mated with the docking station, the current can generate a ramp voltage. This ramp voltage can then reach a threshold voltage in a time that is determined by the known capacitor and the current, which is also known. Accordingly, when the ramp voltage reaches the threshold voltage in a specific window of time, it can be determined that an accessory is mated to the docking station. Conversely, when the ramp voltage reaches the threshold voltage outside of the specific window of time (for example, earlier than the specific window of time), it can be determined that no accessory is mated to the docking station.

These and other embodiments of the present invention can disable the current source once the ramp voltage reaches a first voltage. A pull-down resistor can be connected to the docking station contact to ensure that the ramp voltage decays once the current source is disabled. If moisture is present, the moisture can provide an additional pull-down resistance, thereby causing the ramp voltage to decay more quickly. Accordingly, when the ramp voltage decays below the threshold voltage before a first duration, it can be determined that moisture is present at the connection to the accessory. Conversely, when the ramp voltage decays below the threshold voltage after the first duration, it can be determined that moisture (or more specifically, excessive moisture) is absent at the connection to the accessory. When an accessory is detected, and excessive moisture is absent, the docking station can charge the accessory, otherwise the docking station can prevent such charging to protect the contacts of the docking station and accessory.

In these and other embodiments of the present invention, the use of the term moisture can refer to excessive moisture, since some level of moisture is almost always present in air. Excessive moisture can be an amount of moisture that can cause corrosion to contacts of the docking station or accessory, and is subject to normal manufacturing tolerances.

These and other embodiments of the present invention can provide further refinements. For example, the presence or absence of moisture can be more accurately determined by using different durations as the first duration depending on whether or not the presence of an accessory is determined. For example, where no accessory is found, a shorter duration can be used as the first duration in determining the presence of excessive moisture, while when an accessory is found, a longer duration can be used as the first duration in determining the presence of excessive moisture. This can help to prevent the presence or absence of the accessory from desensitizing the determination of the presence of excessive moisture.

In these and other embodiments of the present invention, the connection detect circuit and the contamination detect circuit can be connected to the same contact. In these and other embodiments of the present invention, the connection detect circuit and the contamination detect circuit can be connected to separate and different contacts. Also, in these examples, the connection detect circuit and the contamination detect circuit can be connected to a power contact.

In these and other embodiments of the present invention, the connection detect circuit and the contamination detect circuit can be connected to a power contact or a contact other than a power contact. For example, either or both the connection detect circuit and the contamination detect circuit can be connected to another type of contact such as a contact used for an enable signal, low-frequency data signal, or other data, control, bias, supply, or other type of contact.

Embodiments of the present invention can provide connection and moisture detection for various types of devices, such as portable computing devices, tablet computers, desktop computers, laptops, all-in-one computers, audio devices, wearable computing devices, cell phones, smart phones, media phones, storage devices, portable media players, navigation systems, monitors, power supplies, video delivery systems, adapters, remote control devices, chargers, and other devices. The connection and moisture detection can be done over various types of contacts. These contacts can provide pathways for power and signals that are compliant with various standards such as one of the Universal Serial Bus (USB) standards including USB Type-C, High-Definition Multimedia Interface® (HDMI), Digital Visual Interface (DVI), Ethernet, DisplayPort, Thunderbolt™, Lightning®, Joint Test Action Group (JTAG), test-access-port (TAP), Directed Automated Random Testing (DART), universal asynchronous receiver/transmitters (UARTs), clock signals, power signals, and other types of standard, non-standard, and proprietary interfaces and combinations thereof that have been developed, are being developed, or will be developed in the future.

Various embodiments of the present invention can incorporate one or more of these and the other features described herein. A better understanding of the nature and advantages of the present invention can be gained by reference to the following detailed description and the accompanying drawings.

DESCRIPTION OF ILLUSTRATIVE EMBODIMENTS

Figure 1:
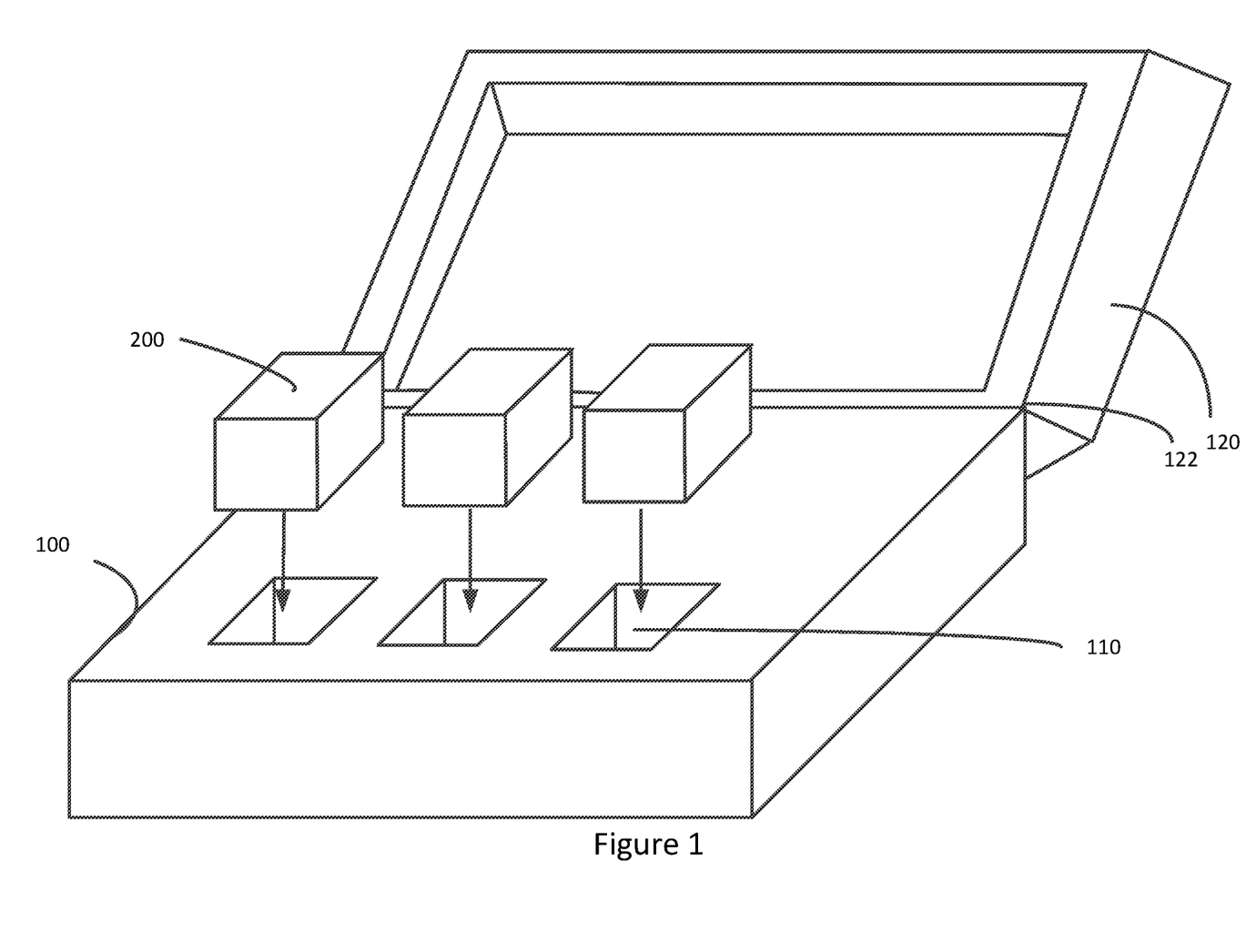
FIG. 1 illustrates an electronic system that can be improved by the incorporation of an embodiment of the present invention.

FIG. 1 illustrates an electronic system that can be improved by the incorporation of an embodiment of the present invention. This figure, as with the other included figures, is shown for illustrative purposes and does not limit either the possible embodiments of the present invention or the claims.

In this example, three accessories 200 can be placed in openings or recesses 110 in docking station 100. Docking station can also include optional lid 120, which can be attached using hinge 122. Accessories 200 can communicate with docking station 100 when mated with docking station 100. In these and other embodiments of the present invention, accessories 200 can communicate with docking station 100 when accessories 200 are not docked in docking station 100. Also, in various embodiments of the present invention, accessories 200 can communicate with each other through docking station 100 when docked. In these and other embodiments, accessories 200 can communicate with each other when they are not docked in docking station 100. These communications can be wired or wireless. For example, they can be Bluetooth or other wireless communications. Docking station 100 can also provide charging power to one or more of the accessories 200.

In this example, charging and communication between accessories 200 and docking station 100 can be one where data and a charging voltage are provided over the same contact. In a specific embodiment of the present invention, docking station 100 can provide a charging voltage on a first contact and a reference ground on a second contact of an interface between docking station 100 and an accessory 200. Data can be transferred by modulating the charging voltage on the first pin. Docking station 100 can modulate the charging voltage to send data to accessory 200 and accessory 200 can modulate the charging voltage itself to send data to docking station 100. More specifically, the modulation can be done by adding or omitting an intermediate frequency (IF) signal or radio frequency (RF) to the charging voltage.

In this example, three accessories 200 are shown, though in other embodiments, docking station 100 can support one, two, or more than three accessories 200. Docking station 100 can have a relatively flat surface, it can be a case or other container having a lid, or it can have another appropriate form factor. Accessories 200 can be rechargeable batteries, speakers, Bluetooth headphones, headsets, or earbuds, wearable computing or media devices such as jewelry or watches, or other types of accessories. Docking station 100 can include one or more optional receptacles or other surfaces or recesses 110 for supporting accessories 200 during charging and data transfers. Charging and data transfers can occur over electrical connections formed between contacts on accessories 200 and contacts in or on recesses 110.

Docking station 100 can be powered by an internal battery, external power source, or other appropriate source or combination thereof. Docking station 100 can provide power to one or more accessories 200. Accessories 200 and docking station 100 can communicate with each other. Also, accessories 200 can communicate with each other via docking station 100. These communications can include authentication and identification information, firmware and software updates, user provided preferences, or other information.

When accessory 200 is inserted in recesses 110 or otherwise mated with docking station 100, docking station 100 can determine that it is mated to accessory 200. Docking station can also detect whether or not moisture is present at the mating connection. These determinations can allow accessory 200 to be charged by docking station 100.

Accessories 200 can be, or can include rechargeable batteries. Accordingly, docking station 100 can charge these rechargeable batteries when accessories 200 are inserted into recesses 110 in docking station 100. Accordingly, embodiments of the present invention can provide circuitry to enable docking station 100 to determine that an accessory 200 has been inserted in a recess 110. This charging can be done using a power or other contact, as well as a ground contact, on docking station 100. To avoid corrosion, embodiments of the present invention can provide circuitry to prevent this charging from occurring in the presence of moisture on these contacts. An example is shown in the following figure.

Figure 2:
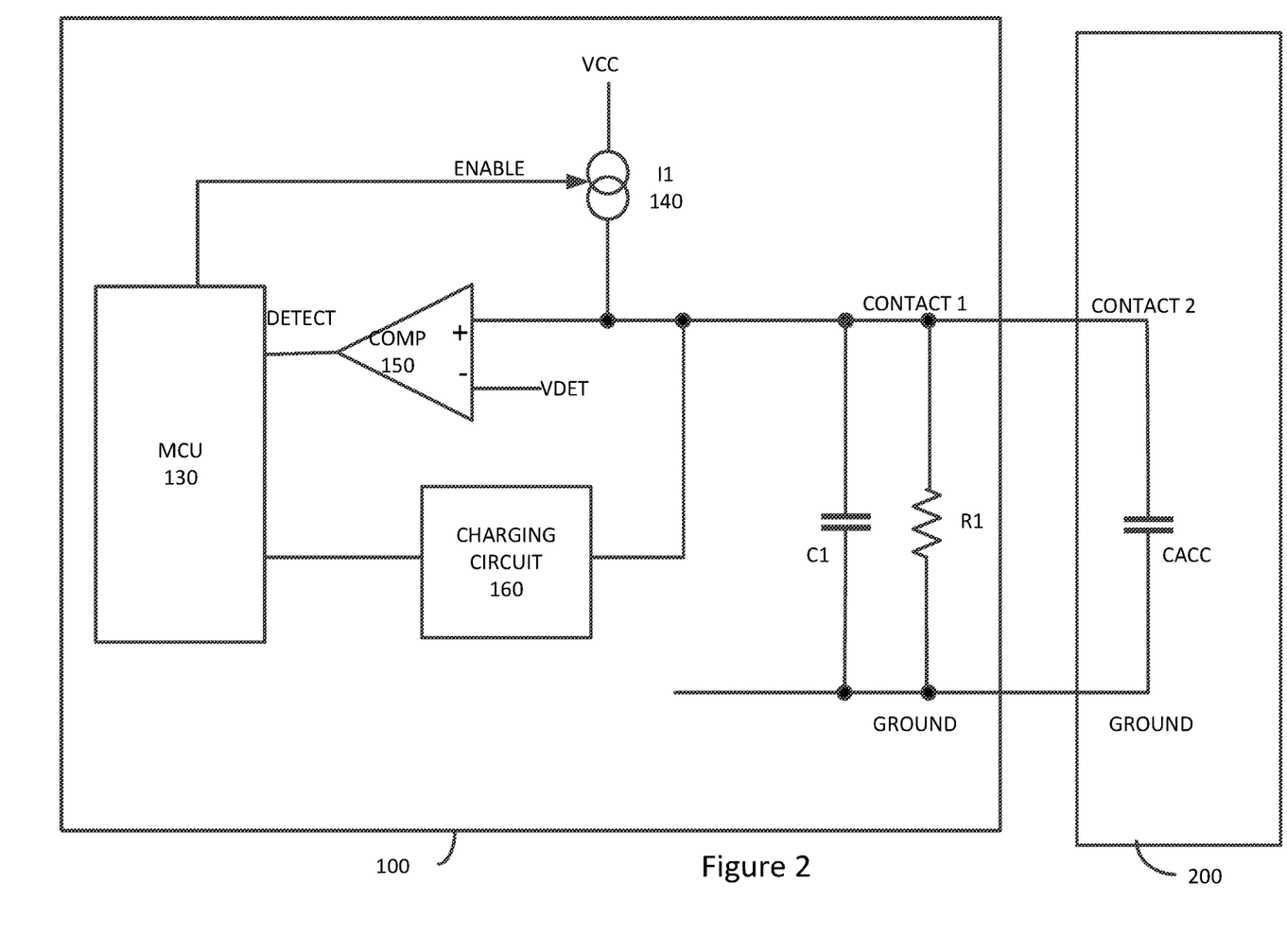
FIG. 2 illustrates connection and moisture detection circuitry according to an embodiment of the present invention.

FIG. 2 illustrates connection and moisture detection circuitry according to an embodiment of the present invention. In various embodiments of the present invention, this circuitry can be repeated for each recess 110 (shown in FIG. 1) in docking station 100. In these and other embodiments of the present invention, some or all of this circuitry, such as microcontroller 130, can be shared among more than one recess 110.

Capacitor C1 and resistor R1 can be fixed or discrete components in docking station 100. They can be components on an integrated circuit that includes other circuits, such as some or all of the other circuits shown here. R1 can be used to pull a voltage on CONTACT 1 to ground in the absence of other currents or voltages. Capacitor C1 can provide a known capacitance for calibration purposes. Accessory 200 can include a capacitor CACC. Capacitor CACC can be a fixed known capacitor housed in or on the surface of accessory 200.

When determining whether accessory 200 is present, microcontroller 130 can enable current source I1 140 using the ENABLE signal. Current source I1 140 can provide a current into CONTACT 1 of docking station 100. When CONTACT 2 of accessory 200 is connected to CONTACT 1 of docking station 100, current source I1 140 can charge capacitors C1 and CACC. When accessory 200, and therefore capacitor CACC, is present, a voltage on CONTACT 1 can charge at a relatively slower rate. When accessory 200, and therefore capacitor CACC, is absent, a voltage on CONTACT 1 can charge at a relatively faster rate.

The current provided by current source I1 140 into CONTACT 1 docking station 100 can generate a ramp voltage. This ramp voltage can increase from ground, or near ground, to a voltage near VCC, which can be a power supply in docking station 100, or other voltage. Comparator 150 can compare the ramp voltage on CONTACT 1 to a threshold voltage VDET and can provide a DETECT output to microcontroller 130. When the ramp voltage on CONTACT 1 reaches the threshold voltage VDET, comparator 150 can provide a rising edge on the DETECT signal to microcontroller 130, though a falling edge could be used in these and other embodiments of the present invention. Microcontroller 130 can then determine whether the ramp voltage has reached the VDET threshold within a certain time window. For example, when accessory 200, and therefore capacitor CACC, is present, the current provided by current source I1 140 into capacitor C1 and CACC can provide a ramp voltage that reaches the threshold VDET at a specific time. This specific time can be determined by the magnitude of the current from current source I1 140 and the capacitance values of the capacitors C1 and CACC. The resistance of R1 can act to slow the charge rate of these capacitors and can also be accounted for. Once determined, this specific time can be bracketed for manufacturing and other tolerances to generate a window. When microcontroller 130 determines that the ramp voltage has reached the VDET threshold within that time window, microcontroller 130 can determine that accessory 200 is present. When the ramp voltage on CONTACT 1 reaches the VDET threshold outside of that window, microcontroller 130 can determine that accessory 200, and therefore capacitor CACC, are not present.

In these and other embodiments of the present invention, microcontroller 130 can follow other algorithms in determining whether accessory 200 is present. Again, when accessory 200, and therefore capacitor CACC, is present, the current source I1 140 can be expected to produce a ramp voltage at CONTACT 1 that reaches the VDET voltage threshold at a specific time. That specific time can be adjusted (shortened) for manufacturing and other tolerances and used to generate a first threshold duration. If the ramp voltage on CONTACT 1 reaches the VDET voltage threshold before that first threshold duration, microcontroller 130 can determine that capacitor CACC, and therefore accessory 200, is absent. If the ramp voltage on CONTACT 1 reaches the VDET voltage threshold after that first threshold duration, microcontroller 130 can determine that accessory 200 is present.

Once it has been determined that accessory 200 is present, embodiments of the present invention can check whether moisture can be detected at CONTACT 1 of docking station 100. If no such moisture is detected, charging circuit 160 can be enabled by microcontroller 130 to provide a charging voltage at CONTACT 1, or other contact of docking station 100. If moisture is detected at CONTACT 1, microcontroller 130 can continue to disable charging circuit 160 until the moisture has been removed.

To detect moisture, or more specifically an excess amount of moisture, microcontroller 130 can disable current source I1 140. In the absence of moisture and when an accessory 200 is present, the voltage on CONTACT 1 can decay following an RC time constant determined by the product of the values of the resistance of the resistor R1 and the sum of the capacitances of the capacitors C1 and CACC. When moisture is present, the moisture can provide a leakage path from CONTACT 1 to ground (or other contact or voltage in or associated with recess 110.) This leakage path can appear as a resistor in parallel with resistor R1. This parallel resistance can reduce the RC time constant at CONTACT 1 of docking station 100, thereby leading to a faster decay time. Accordingly, comparator 150 can send an output DETECT signal to microcontroller 130 when the voltage on CONTACT 1 has decayed to the VDET threshold voltage. Again, in the absence of excessive moisture and when an accessory is present, an expected value for this decay can be determined by the resistance value of R1 and the capacitance of the combination of capacitors C1 and CACC. This expected time can be adjusted (shortened) for manufacturing and other tolerances and used to generate a second threshold duration. When microcontroller 130 determines that the decay time is greater than this second threshold duration, microcontroller 130 can determine that no moisture is present. When microcontroller 130 determines that the decay time is faster than this second threshold duration, microcontroller 130 can determine that excessive moisture is present and is forming a leakage path from CONTACT 1.

Similarly, in the absence of moisture and when no accessory 200 is present, the voltage on CONTACT 1 can decay following an RC time constant determined by the product of the values of the resistance of the resistor R1 and the capacitance of the capacitor C1. When moisture is present, the moisture can provide a leakage path from CONTACT 1 to ground (or other contact or voltage in or associated with recess 110.) This leakage path can again appear as a resistor in parallel with resistor R1. This parallel resistance can reduce the RC time constant at CONTACT 1 of docking station 100, thereby leading to a faster decay time. The new, shorter expected time can be adjusted (shortened) for manufacturing and other tolerances and used to generate a third threshold duration. When microcontroller 130 determines that the decay time is greater than this third threshold duration, microcontroller 130 can determine that no moisture is present. When microcontroller 130 determines that the decay time is faster than this third threshold duration, microcontroller 130 can determine that excessive moisture is present and is forming a leakage path from CONTACT 1.

By utilizing the same comparator and threshold voltage for both connection detection and moisture detection, embodiments of the present invention can provide simplified circuitry that can reduce power consumption and conserve resources. In these and other embodiments of the present invention, different threshold voltages can be used for connection detection and moisture detection. For example, comparator 150 can be a hysteresis comparator.

Figure 3:
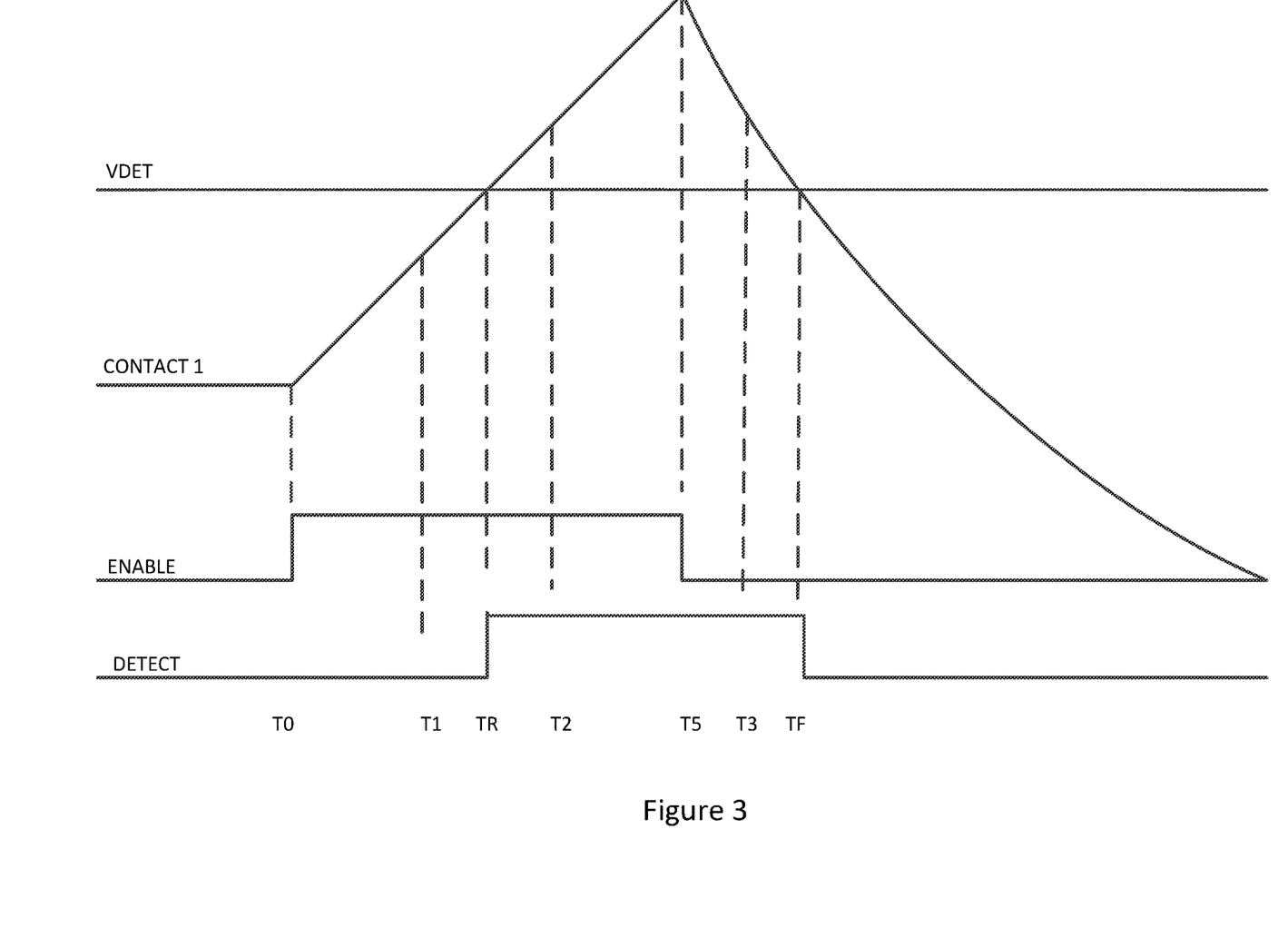
FIG. 3 is a timing diagram illustrating the operation of FIG. 2.

A timing diagram showing the operation of this circuitry is shown in the following figure.

FIG. 3 is a timing diagram illustrating the operation of FIG. 2 when an accessory and no excessive moisture are present at CONTACT 1 of docking station 100. A specific time for when the ramp voltage on CONTACT 1 can reach the VDET threshold can be found given the values of resistor R1, capacitor C1, and capacitor CACC. This specific time can be adjusted for manufacturing and other tolerances to generate a window from time T1 to T2.

At time T0, microcontroller 130 can enable current source I1 140. Current source I1 140 can provide current into capacitors C1 and CACC, thereby generating a ramp voltage on CONTACT 1. The ramp voltage on CONTACT 1 can reach the VDET threshold voltage at time TR. This can cause the output DETECT of comparator 150 to go high at time TR. Since time TR is in the window from T1 to T2, microcontroller 130 can determine that accessory 200 is present in docking station 100. When time TR occurs before time T1, microcontroller 130 can determine that accessory 200, and therefore capacitor CACC, is not present. Again, in these and other embodiments of the present invention, instead of a window, a duration threshold, which might or might not be the time from T0 to T1, can be used instead of a window.

At time T5, microcontroller 130 can disable current source 140. This can cause the voltage on CONTACT 1 to decay from a peak voltage back to ground through resistor R1. Since it was determined above that an accessory 200 is present, the decay time can be determined by the values of resistor R1, and the capacitors C1 and CACC. An expected time can be found and adjusted (shortened) using manufacturing and other tolerances to generate a duration from T5 to T3. When the voltage on CONTACT 1 falls to the VDET threshold voltage, the DETECT signal at the output of comparator 150 can go low at time TF. Since time TF occurs after the duration indicated by time T3, microcontroller 130 can determine that excess moisture is not present at CONTACT 1 of docking station 100. If the following edge of the DETECT signal TF were to occur before time T3, microcontroller 130 could determine that excessive moisture is present and causing a leakage path from CONTACT 1.

Figure 4:
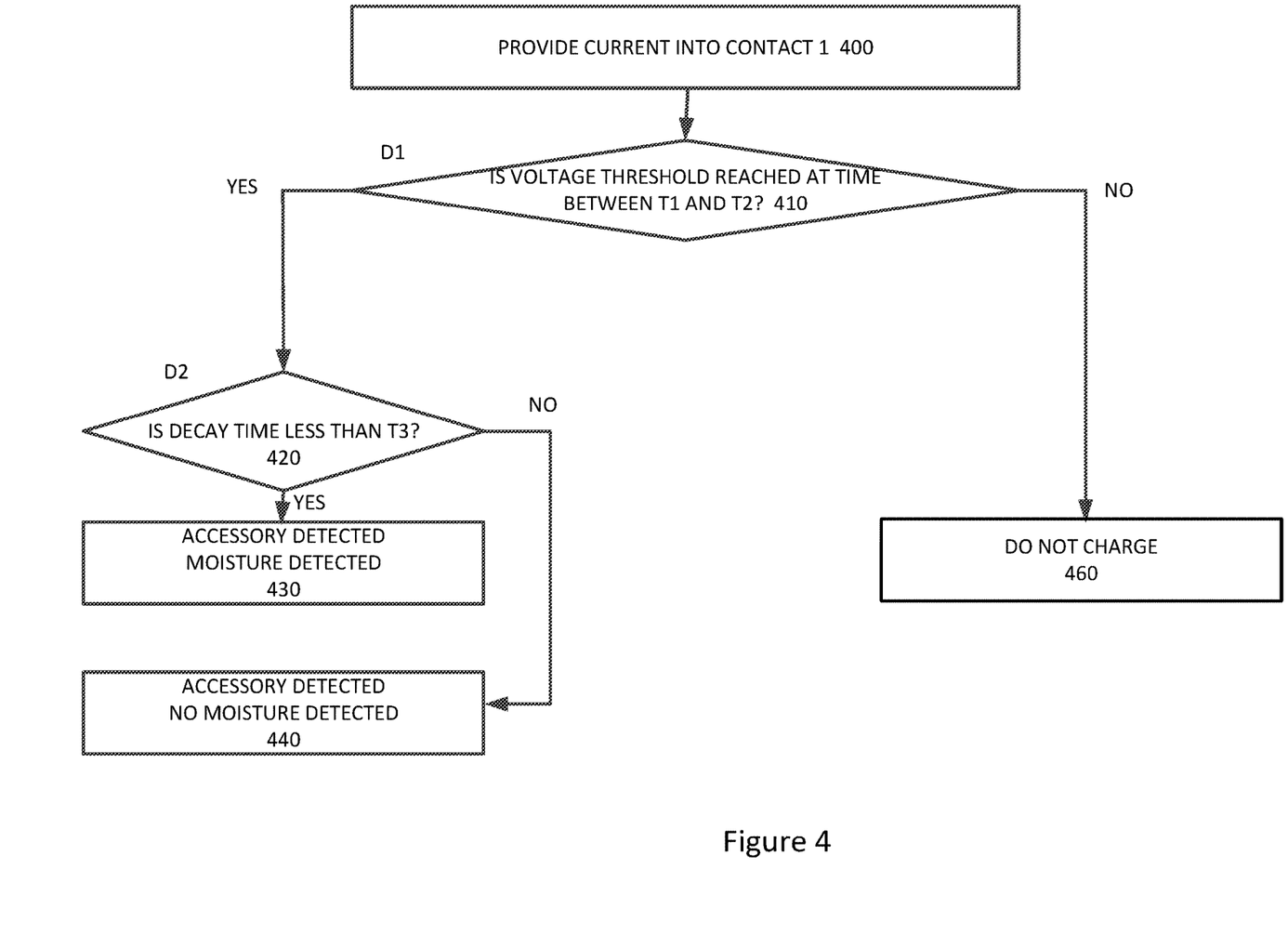
FIG. 4 is a flowchart illustrating the operation of the circuitry of FIG. 2.

A flowchart illustrating the operation of the circuitry in FIG. 2 is shown in the following figure.

FIG. 4 is a flowchart illustrating the operation of a docking station according to an embodiment of the present invention. In act 400, a current can be provided into a contact, such as CONTACT 1, of docking station 100. In act 410, it can be determined if a threshold voltage is reached between times T1 and T2. If not, then no charging should occur in act 460. When the threshold is reached at a time between T1 and T2, it can be determined that an accessory is present. It can then be determined in act 420 if a decay time is less than a duration defined by time T3 in act 420. If it is not, then no moisture is detected and charging can proceed in act 440. If the decay time to reach the VDET threshold voltage is less than the duration indicated by time T3, then moisture is detected and no charging should occur in act 430.

Figure 5:
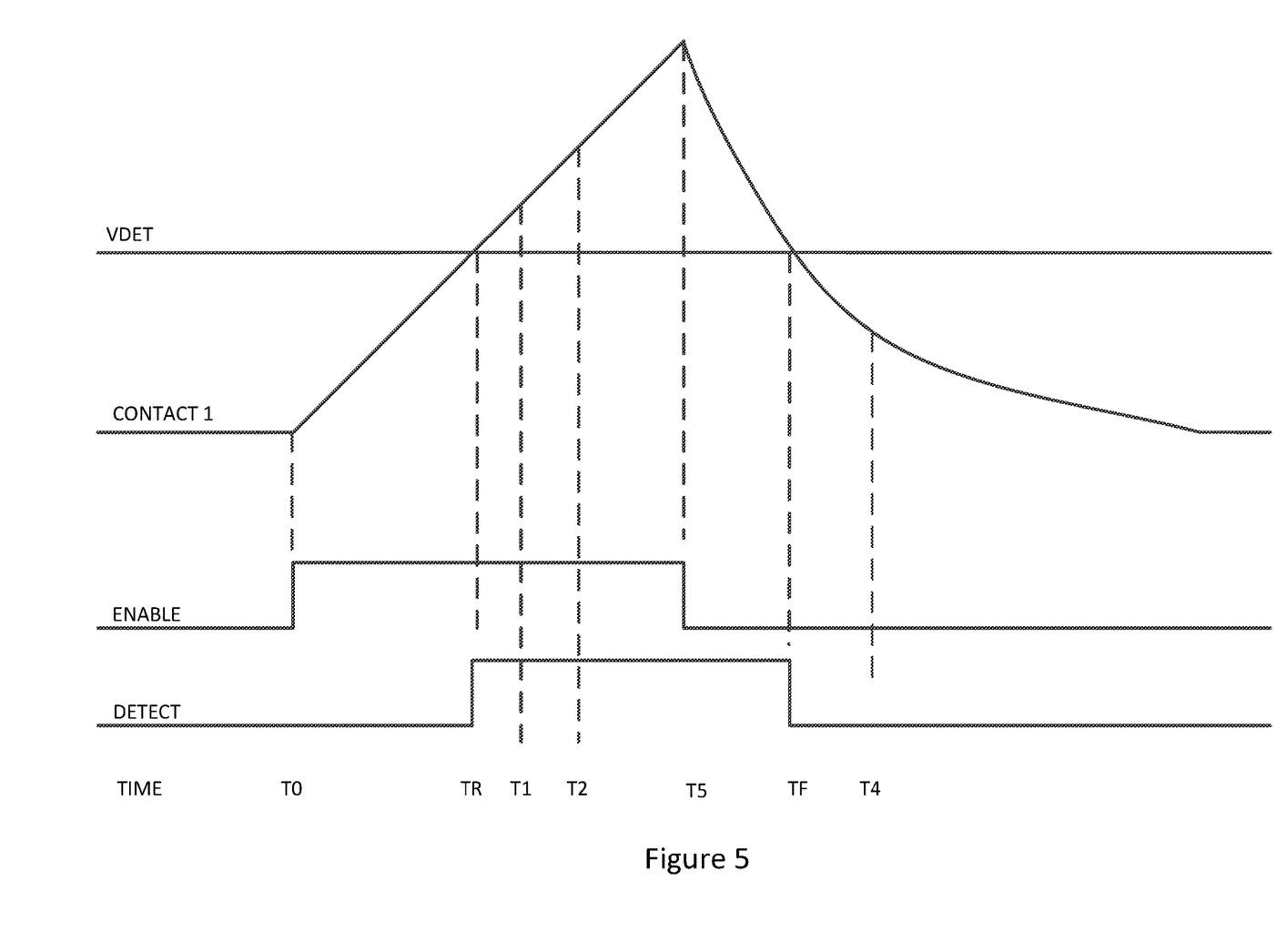
FIG. 5 is another timing diagram illustrating the operation of the circuitry of FIG. 2.

FIG. 5 is another timing diagram illustrating the operation of the circuitry of FIG. 2. In this example, a ramp voltage on CONTACT 1 of docking station 100 reaches the VDET threshold voltage at time TR, thereby causing the output DETECT signal of comparator 150 to go high. Since TR occurs before times T1 and T2, microcontroller 130 can determine that no accessory 200 is present in a corresponding recess 110 of docking station 100.

Since accessory 200, and therefore capacitor CACC, is absent, the voltage on CONTACT 1 can be expected to decay with the RC time constant determined by the product the resistance value of resistor R1 and the capacitance value of capacitor C1. The voltage on CONTACT 1 can be expected to reach the VDET threshold voltage at a specific time. As before, this specific time can be adjusted (shortened) for manufacturing and other tolerances to generate a duration, indicated here as the duration from T5 to T4. Again, when moisture is present at CONTACT 1, it can appear as a resistance in parallel to R1, which can reduce the time constant present at CONTACT 1. Accordingly, when a decay time is faster than the duration from T5 to T4, microcontroller 130 can determine that moisture is present, and when the decay time is slower than the duration from T5 to T4, microcontroller 130 can determine that no moisture, or specifically no excessive moisture, is present.

Figure 6:
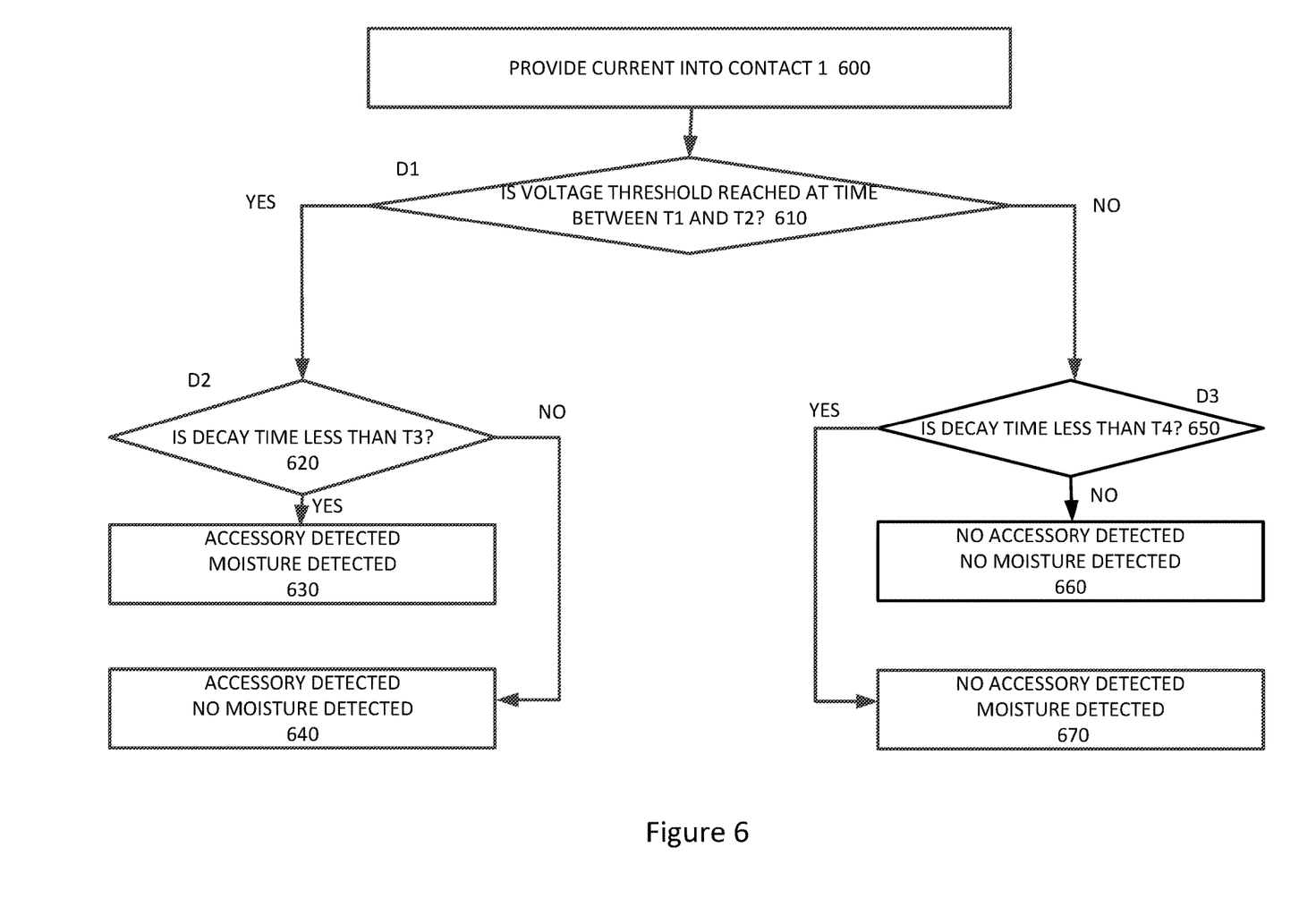
FIG. 6 is another flowchart illustrating the operation of the circuitry of FIG. 2.

Accordingly, at time T5, microcontroller 130 can disable current source I1 140, and the voltage on CONTACT 1 can begin to decay to ground. The voltage on CONTACT 1 can again reach the VDET threshold voltage at time TF, thereby causing the output DETECT of comparator 152 fall. Since time TF occurs before the end of the duration from T5 to T4, microcontroller 130 can determine that moisture is present at CONTACT 1. A flowchart illustrating this is shown in the following figure.

FIG. 6 is another flowchart illustrating the operation of the circuitry of FIG. 2. In act 600, a current is provided into CONTACT 1. In act 610, it can be determined whether a resulting ramp voltage on CONTACT 1 reaches a threshold voltage at a time between T1 and T2. If it does, then microcontroller 130 can determine that an accessory is present. In act 620, it can be determined whether a decay time is less than a first duration indicated by time T3. Again, this first duration can be determined using the time constant equal to the product of the resistance of R1 and the capacitance of capacitors C1 and CACC. If the decay time for the voltage on CONTACT 1 to reach the VDET threshold voltage is less than this first duration, then moisture is detected in act 630. If the decay time is longer than this first duration, then no moisture is detected in act 640.

In act 610, since the voltage threshold is reached at a time outside of the window between T1 and T2, it can be determined that no accessory is present in recess 110 of docking station 100. In act 650, it can be determined whether the voltage on CONTACT 1 reaches the VDET threshold voltage in less time than a second duration indicated by time T4. Again, this second duration can be determined using the time constant equal to the product of the resistance of R1 and the capacitance of capacitor C1. If the decay time is less than this second duration, then moisture is detected in act 670. If the decay time is longer than this second duration, then no moisture is detected in act 660.

In these and other embodiments of the present invention, adjustments in the window and threshold durations can be made for manufacturing and other tolerances. These adjustments can compensate for errors in the current provided by I1 140, the VDET threshold voltage, stray resistances and capacitances of the contacts, traces, and components on or associated with interconnect illustrated in FIG. 2 or otherwise described, components tolerances of capacitor C1, resistor R1, and capacitor CACC, delays through comparator 150 and microcontroller 130, as well as other errors.

In these and other embodiments of the present invention, instead of determining whether an accessory is present by determining whether a threshold voltage is reached in a time window, or before a duration, a value of capacitance at a contact, such as CONTACT 1, can be determined to be in a window or below (or above) a certain value. Since other components are known, the value of the capacitance at CONTACT 1 can be found using the same circuits and methods disclosed herein. Similarly, the presence of moisture can be determined by determining whether a resistance at CONTACT 1 is below a certain value.

In these and other embodiments of the present invention, the connection detect circuit and the contamination detect circuit can be connected to the same contact. In these and other embodiments of the present invention, the connection detect circuit and the contamination detect circuit can be connected to separate and different contacts. Also, in these examples, the connection detect circuit and the contamination detect circuit can be connected to a power contact.

In these and other embodiments of the present invention, the connection detect circuit and the contamination detect circuit can be connected to a contact other than a power contact. For example, either or both the connection detect circuit and the contamination detect circuit can be connected to another type of contact such as a contact used for an enable signal, low-frequency data signal, or other data, control, bias, supply, or other type of contact.

Embodiments of the present invention can provide connection and moisture detection for various types of devices, such as portable computing devices, tablet computers, desktop computers, laptops, all-in-one computers, wearable computing devices, audio devices, cell phones, smart phones, media phones, storage devices, portable media players, navigation systems, monitors, power supplies, video delivery systems, adapters, remote control devices, chargers, and other devices. The connection and moisture detection can be done over various types of contacts. These contacts can provide pathways for power and signals that are compliant with various standards such as one of the Universal Serial Bus (USB) standards including USB Type-C, High High-Definition Multimedia Interface® (HDMI), Digital Visual Interface (DVI), Ethernet, DisplayPort, Thunderbolt™, Lightning®, Joint Test Action Group (JTAG), test-access-port (TAP), Directed Automated Random Testing (DART), universal asynchronous receiver/transmitters (UARTs), clock signals, power signals, and other types of standard, non-standard, and proprietary interfaces and combinations thereof that have been developed, are being developed, or will be developed in the future.

The above description of embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated. Thus, it will be appreciated that the invention is intended to cover all modifications and equivalents within the scope of the following claims.

What is claimed is:

1. An electronic system comprising:
a docking station comprising:
a current source to provide a current into a contact of the docking station to generate a ramping voltage on the contact and to then stop providing the current into the contact to generate a decaying voltage on the contact;
a comparator having a first input to receive the voltage on the contact and a second input to receive a threshold voltage; and
a microcontroller to enable and disable the current source and to receive an output of the comparator, wherein responsive to the output of the comparator changing state in response to the ramping voltage on the contact and changing state in response to the decaying voltage on the contact, the microcontroller determines a presence or absence of an accessory and the presence or absence of excessive moisture at the contact of the docking station.

2. The electronic system of claim 1 further comprising a charging circuit to provide a charging voltage to an accessory when the presence of an accessory is detected and the absence of excessive moisture is detected and to otherwise not provide a charging voltage.

3. The electronic system of claim 2 wherein the microcontroller determines the presence or absence of an accessory by providing a current into the contact and determining whether the comparator changes state in a first time window.

4. The electronic system of claim 3 wherein the microcontroller determines the presence or absence of excessive moisture by not providing the current into the contact and determining whether the comparator changes state before a first duration.

5. The electronic system of claim 3 wherein the microcontroller provides the current into the contact by enabling the current source.

6. The electronic system of claim 3 wherein the microcontroller does not provide the current into the contact by disabling the current source.

7. An electronic system comprising:
a docking station comprising:
first circuitry to provide a current into a first contact of the docking station;
second circuitry to determine whether a ramp voltage generated by the current reaches a threshold voltage in a first time window; and
the first circuitry to further stop providing the current into the first contact of the docking station;
the second circuitry to, after the first circuitry stops providing the current, to determine if a decay of the ramp voltage reaches the threshold voltage after a first duration; and
charging circuitry, responsive to the ramp voltage reaching the threshold voltage in the first time window and the decay of the ramp voltage reaching the threshold voltage after the first duration, to provide a charging voltage to an accessory mated with the docking station.

8. The electronic system of claim 7 wherein the charging voltage is provided to the accessory using the first contact of the docking station.

9. The electronic system of claim 7 wherein the charging voltage is provided to the accessory using a second contact of the docking station.

10. The electronic system of claim 7 wherein the first circuitry comprises a current source.

11. The electronic system of claim 10 wherein the second circuitry comprises a comparator.

12. The electronic system of claim 10 wherein the second circuitry comprises a comparator and a microcontroller.

13. The electronic system of claim 12 wherein the microcontroller is configured to enable and disable the current source, to receive an output of the comparator, and to enable and disable a charging circuit.

14. An electronic system comprising:
a docking station comprising:
a first contact;
detection circuitry to determine whether a capacitance at the first contact of the docking station is in a first range, the detection circuitry to, in response to determining whether the capacitance is in the first range, determine whether a resistance at the first contact of the docking station is in a second range; and
charging circuitry to provide power to an accessory mated with the docking station when the capacitance is in the first range and the resistance is in the second range, and otherwise to not provide power to the accessory.

15. The electronic system of claim 14 wherein the power is provided to the accessory using the first contact of the docking station.

16. The electronic system of claim 14 wherein the power is provided to the accessory using a second contact of the docking station.

17. The electronic system of claim 14 wherein the detection circuitry determines whether a capacitance at the first contact of the docking station in a first range by providing a charging current at the first contact of the docking station.

18. The electronic system of claim 17 further comprising the accessory, wherein the accessory mates with the docking station using a first contact of the accessory, wherein the accessory comprises a capacitor connected between the first contact of the accessory and ground.

19. The electronic system of claim 18 wherein the first contact of the accessory is a power contact.

* * * * *